United States Patent [19]

Kato et al.

[11] Patent Number: 4,635,150

[45] Date of Patent: Jan. 6, 1987

[54] APPARATUS FOR AUTOMATICALLY SELECTING AND REPRODUCING A RECORDING MEDIUM

[75] Inventors: Hiroyasu Kato, Hino; Hirokazu Denda, Fussa, both of Japan

[73] Assignee: Victor Company of Japan Ltd., Yokohama, Japan

[21] Appl. No.: 467,819

[22] Filed: Feb. 18, 1983

[30] Foreign Application Priority Data

Feb. 22, 1982 [JP] Japan ................................. 57-26994
Mar. 9, 1982 [JP] Japan ................................. 57-37026
Mar. 12, 1982 [JP] Japan ............................. 57-34771[U]
Apr. 16, 1982 [JP] Japan ................................. 57-63665

[51] Int. Cl.⁴ ............................................. G11B 5/012
[52] U.S. Cl. ..................................... 360/98; 352/8; 360/92; 360/137
[58] Field of Search ................. 360/98, 90, 91, 92, 360/93, 88, 137, 86, 32; 352/6, 8, 123; 369/36, 37

[56] References Cited

U.S. PATENT DOCUMENTS

| | | | |
|---|---|---|---|
| 1,422,321 | 7/1922 | Swain | 369/37 |
| 2,839,305 | 6/1958 | Andres | 369/37 |
| 3,501,153 | 3/1970 | Osborne | 369/37 |
| 3,555,509 | 1/1971 | Arsem | 369/34 |
| 3,722,892 | 3/1973 | Haake | 360/92 |
| 3,938,190 | 2/1976 | Semmlow et al. | 360/92 |
| 3,967,828 | 7/1976 | Topolski | 369/35 |
| 4,113,366 | 9/1978 | Glover | 352/123 |

FOREIGN PATENT DOCUMENTS

302609 10/1954 Switzerland.

*Primary Examiner*—John H. Wolff
*Assistant Examiner*—Andrew L. Sniezek
*Attorney, Agent, or Firm*—Roberts, Spiecens & Cohen

[57] ABSTRACT

A reproducing apparatus for automatically selecting and reproducing a recording medium comprises a reproducing device fixed at a predetermined position, for reproducing a recording medium loaded therein, a recording medium storing part arranged fixedly along a circular arc passing through the reproducing device, for storing a plurality of the recording mediums in a radial arrangement within a plurality of recording medium storing chambers each having an address assigned thereto, a designating circuit for designating an address corresponding to one storing chamber from among the plurality of storing chambers, and a recording medium holding and carrying mechanism constituted by an arm structure which is axially supported at a position corresponding to a center of the circular arc. The holding and carrying mechanism holds one recording medium within the designated storing chamber, and moves between the storing part and the reproducing device by undergoing angular rotation to carry and load the one recording medium into the reproducing device.

3 Claims, 27 Drawing Figures

APPARATUS FOR AUTOMATICALLY SELECTING AND REPRODUCING A RECORDING MEDIUM

BACKGROUND OF THE INVENTION

The present invention generally relates to apparatus for automatically selecting and reproducing a recording medium, and more particularly to an apparatus for automatically selecting and reproducing a recording medium comprising a storing part for storing recording mediums, a reproducing device for reproducing the recording medium, and a carrying or transporting device for carrying the recording medium, wherein the storing part, reproducing device, and carrying device are all accommodated within a small space.

Various apparatus has been proposed which select and extracts one recording medium from among a plurality of recording mediums such as cassettes and cartridges stored in a storing part, and carries and loads the selected recording medium into a reproducing device, to carry out reproduction. As an example of a conventional apparatus of this type, there is an apparatus comprising a storing part designed in a form of a vertical rack, for storing the recording mediums. A carrier mechanism which searches for the selected recording medium and carries the selected recording medium in this conventional apparatus, was designed so that a main carrier body of the carrier mechanism moves horizontally together with a moving base and moves vertically along a support beam. In this apparatus, a reproducing device was provided beside the vertical rack. However, in this apparatus having the above described construction, the overall size of the apparatus is large because the projected area of the apparatus on the floor is large and the height of the apparatus is great. Furthermore, the carrier mechanism is complex because the main carrier body must be shifted horizontally and vertically. Similar deficiencies were found in other conventional apparatus of this type.

SUMMARY OF THE INVENTION

Accordingly, it is a general object of the present invention to provide a novel and useful apparatus for automatically selecting and reproducing a recording medium, in which the above described deficiencies have been eliminated.

Another and more specific object of the present invention is to provide an apparatus for automatically selecting and reproducing a recording medium, in which a storing part for storing a plurality of recording mediums and a reproducing device for reproducing the recording medium are arranged along one circular arc, and a carrying device for carrying the recording medium between the storing part and the reproducing device is designed as an arm structure which rotates angularly about the center of the above circular arc. According to the apparatus of the present invention, the construction of the apparatus is simple, and the overall size of the apparatus can be reduced. Moreover, the operation to search for a designated recording medium, picking up the designated recording medium, and carrying the designated recording medium to the reproducing device, can be carried out smoothly.

Still another object of the present invention is to provide an apparatus for automatically selecting and reproducing a recording medium, in which the recording medium carrying device is provided with mechanisms such as a mechanism for clamping a rear end of a case which accommodates a disc and a mechanism for reversing the side of the clamped case. The apparatus according to the present invention is especially suited for application to a reproducing apparatus which automatically selects and reproduces a video disc which has recordings on both sides and is accommodated within a case.

Another object of the present invention is to provide an apparatus for automatically selecting and reproducing a recording medium, comprising the recording medium carrying device, in which the carrying device is designed so that the carrying device can be set accurately to oppose a position at the recording medium storing part corresponding to an address of the designated recording medium.

Other objects and further features of the present invention will be apparent from the following detailed description when read in conjunction with the accompanying drawings.

DETAILED DESCRIPTION

Figure 1:
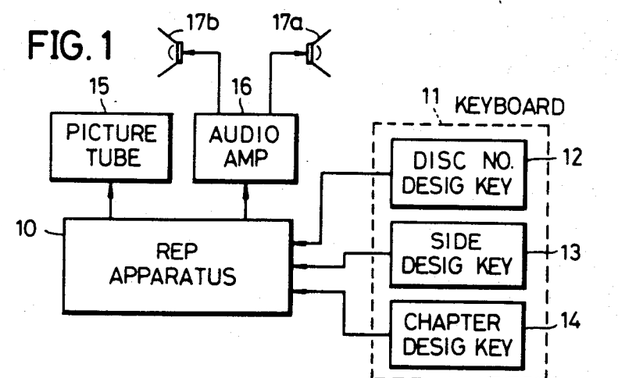
FIG. 1 is a block diagram generally showing an example of an apparatus for automatically selecting and reproducing a video disc in use, which is an embodiment of an apparatus for automatically selecting and reproducing a recording medium according to the present invention.

FIG. 1 shows, in block diagram, an apparatus for automatically selecting and reproducing a video disc (hereinafter simply referred to as a reproducing apparatus), which is an embodiment of an apparatus for automatically selecting and reproducing a recording medium according to the present invention. In FIG. 1, a reproducing apparatus 10 operates in response to command signals related to the disc number, reproducing side, and chapter which are supplied to the reproducing apparatus 10 according to manipulation of a disc number designating key 12, disc reproducing side designating key 13, and disc chapter designating key 14 provided on a keyboard 11. That is, as will be described hereinafter, the reproducing apparatus 10 selects a designated video disc (hereinafter referred to as a disc) on which video and audio signals are recorded from among a plurality of discs according to the command signal from the key 12, and reproduces a designated chapter of a designated reproducing side according to the command signals from the keys 14 and 13. The video signal from the reproducing apparatus 10 is reproduced by a picture tube 15 of a television receiver, and the audio signal is passed through an audio amplifier 16 and reproduced by a pair of speakers 17a and 17b. This system may be utilized as an educational apparatus, or an apparatus which permits the operator to join in and participate with the music piece or song during play, for example.

Figure 2:
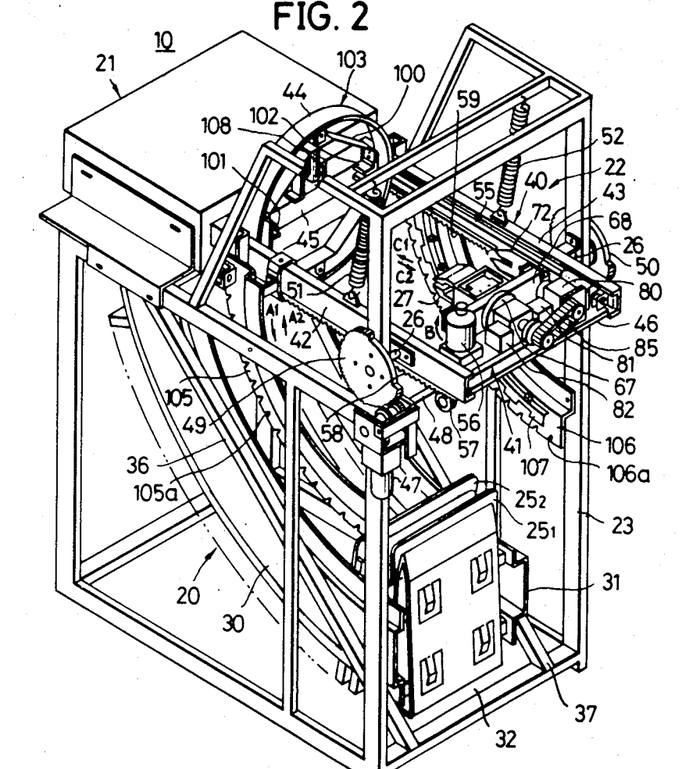
FIG. 2 is a perspective view showing a main body of the apparatus for automatically selecting and reproducing a video disc, with an outer cover removed.

Mechanisms of a main part of the reproducing apparatus 10 are shown in FIG. 2. The reproducing apparatus 10 generally comprises a storing part 20 for storing a plurality of disc cases respectively accommodating discs, disc reproducing device 21, and carrying device 22 for carrying the disc between the storing part 20 and the reproducing device 21. The reproducing apparatus 10 is provided within a frame 23 which is a combination of rectangular pipes.

The reproducing device 21 is arranged horizontally to the frame 23. The reproducing device 21 is fixed and cannot move, and for this reason, the disc can always be reproduced in a satisfactory manner.

The storing part 20 has a circular shape with a center at point P on a horizontal plane including the reproducing device 21, and part 20 extends along an imaginary circular arc 24 passing through the reproducing device 21. The storing part 20 extends along an angular range of approximately 90°, from a lower part of the reproducing device 21 to a lower vertical position at a bottom part of the frame 23. A plurality of video disc cases 25 are arranged radially and stored within the storing part 20. Generally, the storing part has considerable weight, and a large force is required to move the storing part. Moreover, there is a large shock when the movement of the storing part is stopped. Thus, it is desirable for the storing part to be fixed. Accordingly, the storing part 20 is immovable in the present embodiment and is designed to be fixed.

The carrying device 22 is designed as an arm angularly rotatable about the above point P (horizontal shaft 26) between a horizontal position and a lower vertical position. A clamping mechanism 27 for clamping the disc case is provided on the carrying device 22. This clamping mechanism 27 is movable back and forth along the arm for loading the disc, and is angularly rotatable through 180° for reversing the reproducing side of the disc and is normally locked so as not to rotate. The carrying device 22 carries out a search operation to select and extract the designated disc case from the storing part 20 and a loading operation to carry and load the designated disc case into the reproducing device 21, by undergoing back and forth movement and angular rotation. Further, the carrying device 22 also carries out a selecting operation to reverse the side of the disc case and select the designated reproducing side of the disc.

The positional relationships of the storing part 20, reproducing device 21, and carrying device 22 will now be discussed. The reproducing device 21 is arranged and provided at a position opposing a horizontal end surface of the storing part 20, and the carrying device 22 is positioned above the storing part 20 and the moving range of the carrying device 22 is also above the storing part 20. That is, the reproducing device 21 and the carrying device 22 are completely accommodated within a vertical projection of the storing part 20 and do not protrude from the vertical projection of the storing part 20. Accordingly, the projected area of the reproducing apparatus 10 is substantially equal to this projection of the storing part 20, and need not be larger. In addition, because the storing part 20 is in the form of a circular arc shape, the height of the storing part 20 is low compared to a vertical rack type storing part. Thus, the overall size of the reproducing apparatus 10 can be made small, due to the small projected area of the reproducing apparatus 10 required on the floor and the low height H of the reproducing apparatus because of the low storing part 20. Therefore, the reproducing apparatus 10 can easily be set up within a limited space, and the limitations on the set-up position of the reproducing apparatus 10 is greatly eliminated.

The length L of the reproducing apparatus 10 becomes longer by designing the storing part 20 in the circular arc shape, however, such a length is originally required in order to ensure stability of the reproducing apparatus upon set-up. That is, the storing part 20 is designed in the circular arc shape in order to prevent the length L of the reproducing apparatus from becoming excessively long and reduce the height H of the reproducing apparatus. However, at the same time, the design of the storing part 20 helps stabilize the reproducing apparatus upon set-up because of the reduced height H.

The carrying device 22 is an arm structure pivotally supported at a position corresponding to the center point P of the storing part 20. The search for the designated disc case, carrying of the designated disc case, and the like are carried out by the simple angular rotation of this arm structure. A motor for angularly rotating the arm structure is fixedly provided on the frame 23, at a position separated from the arm structure. Hence, the mechanism of the carrying device 22 becomes simple. Furthermore, the weight of the arm structure becomes light to reduce the rotation moment, and as a result, the arm structure can smoothly undergo angular rotation and accurately stop at a predetermined position.

Next, general description will be given with respect to the operation of the reproducing apparatus 10. The reproducing apparatus 10 operates when a disc to be reproduced is designated by manipulating the keys on the keyboard 11, and successively assumes operating modes described hereafter.

Figure 3:
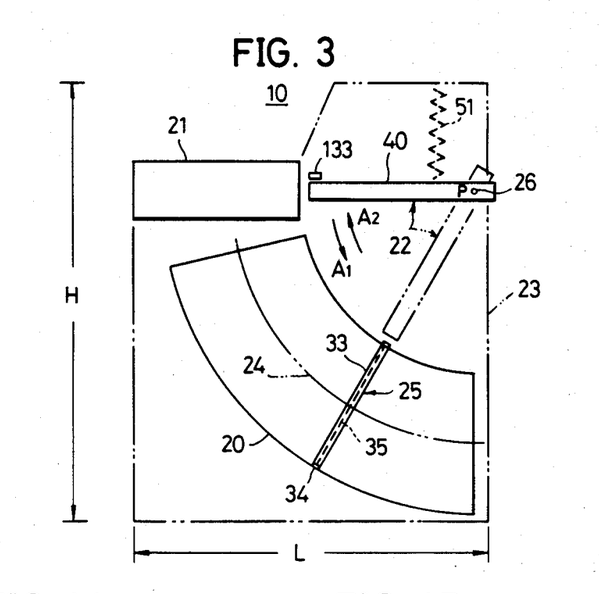
FIG. 3 is a diagram showing relative positional relationships of essential mechanisms of the apparatus according to the present invention.
Figure 4A:
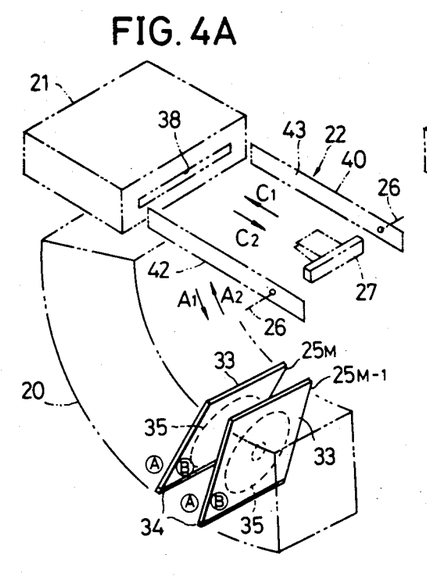
FIG. 4A generally shows the apparatus in an initial state of operation.
Figure 4B:
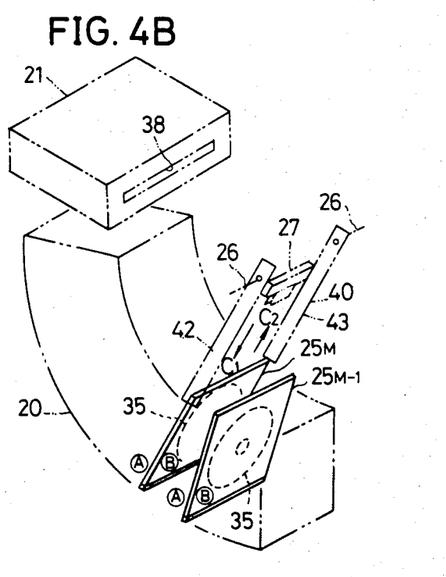
FIGS. 4B, 4C, and 4D respectively show operating states of the apparatus in a video disc searching/carrying mode.
Figure 4C:
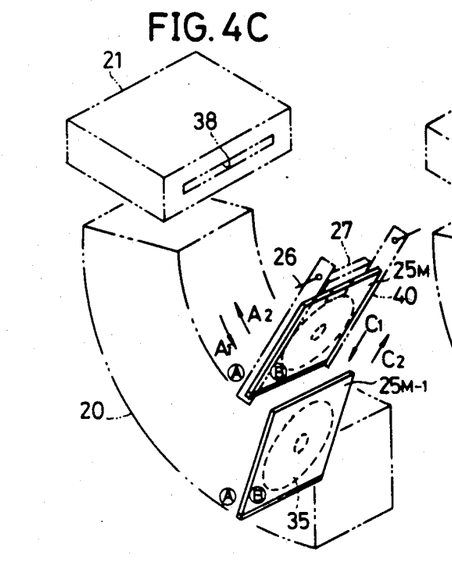

(1) Disc searching/carrying mode (refer to FIGS. 4A, 4B, 4C, and 4D):

During the disc searching/carrying mode, the carrying device 22 rotates angularly towards the direction indicated by an arrow A1 in FIGS. 4A and 4C, and stops at a position opposing a disc case accommodating the designated disc in the storing part 20. Then, the disc clamping mechanism 27 clamps this disc case, and extracts the disc case out of the storing part 20. Further, the carrying device 22 rotates angularly towards the direction of an arrow A2 in FIG. 3, to return to the original horizontal position. The disc case is carried in this manner.

Figure 4D:
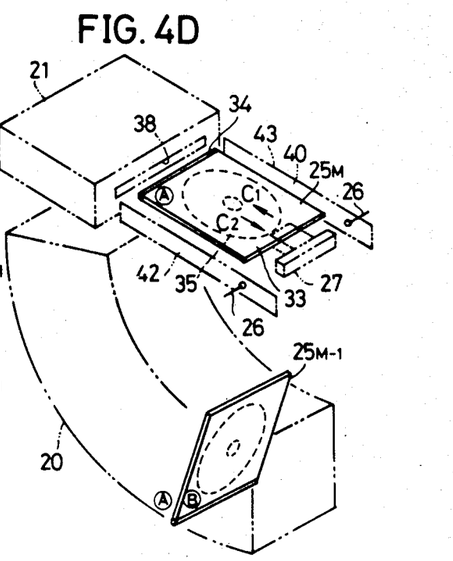
Figure 4E:
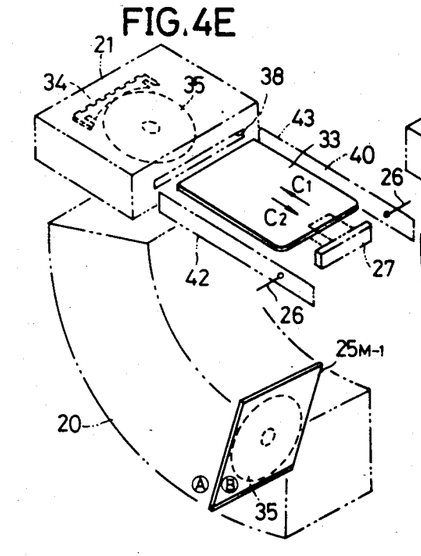
FIG. 4E shows an operating state of the apparatus in a video disc loading/reproducing mode.
Figure 4F:
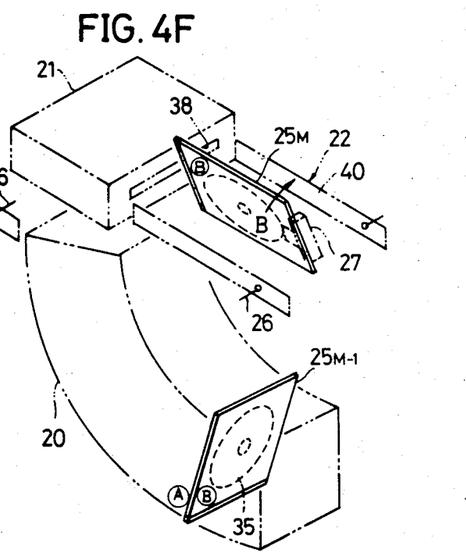
FIG. 4F shows an operating state of the apparatus in a video disc side selecting mode.

(2) Disc side selecting mode (refer to FIG. 4F):

During the disc side selecting mode, the clamping mechanism 27 undergoes one-half revolution in the direction of an arrow B in FIG. 4F according to the needs, so that the side of the disc to be reproduced, that is, the designated side of the disc faces up.

(3) Disc loading mode (refer to FIGS. 4D and 4E):

During the disc loading mode, the clamping mechanism 27 moves back and forth within the arm structure along the directions of arrows C1 and C2 in FIGS. 4D and 4E, to load the disc into the reproducing device 21. The empty disc case extracted from the reproducing device 21 after loading of the disc remains clamped by the clamping mechanism 27, and is held at a position outside the reproducing device 21.

(4) Disc reproducing mode (refer to FIG. 4E):

During the disc reproducing mode, the loaded disc is reproduced by the reproducing device 21.

(5) Disc recovering mode:

During the disc recovering mode, the clamping mechanism 27 moves back and forth to insert the empty disc case into the reproducing device 21, to recover the disc within the disc case and extract the disc case accommodating the disc therein outside the reproducing device 21.

(6) Disc carrying/returning mode:

During the disc carrying/returning mode, the carrying device 22 rotates angularly towards the direction A1 up to a predetermined position. At this predetermined position, the clamping mechanism 27 moves towards the direction C1 and releases the disc case, to return the disc case into the original position in the storing part 20.

Description on the construction and operation of each part of the reproducing apparatus will now be given in more detail.

The storing part 20 comprises mutually opposing side plates 31 and 30 respectively having a circular arc shape provided at the right and left thereof, and a plurality of partitioning plates arranged radially between the side plates 30 and 31. Hence, N (N is an integer) disc storing chambers (not shown) having a bottom are formed between adjacent partitioning plates. In the present embodiment, N=26. As shown in FIGS. 4A and 4E, each of the disc cases 25 comprises a main case body 33 and a lid member 34 detachably mounted to the main case body 33 for closing an opening of the main case body 33, and a disc 35 is accommodated within the main case body 33. Details of the disc case 25 are disclosed in a U.S. Pat. No. 4,360,845 entitled "Case for a Disc-shaped Recording Medium" issued Nov. 23, 1982 in which the assignee is the same as that of the present application. Each of the disc cases 25 are arranged radially and inserted into and stored within respective storing chambers, in a position such that the lid member 34 faces a direction away from the carrying device 22 and the rear end of the main case body 33 faces towards the carrying device 22 with side Ⓐ of the disc 35 facing towards the reproducing device 21. Addresses are assigned to each of the N storing chambers, in an order from the storing chamber located farthest from the reproducing device 21. FIG. 2 shows disc cases $25_1$ and $25_2$ respectively stored within storing chambers assigned to the addresses 1 and 2. FIG. 4 shows disc cases $25_M$ and $25_{M-1}$ respectively stored within storing chambers assigned the addresses M (M is an integer) and M−1.

The storing part 20 is fixedly mounted on oblique rectangular pipes 36 and 37 which act as diagonal beams with respect to the frame 23.

The reproducing device 21 is fixed onto the frame 23. The reproducing device 21 comprises a turntable (not shown) for rotating the disc placed thereon, a pickup mechanism (not shown) for reproducing video and audio signals from the rotating disc, holding mechanism (not shown) for holding the lid member of the disc case, and the like. Details of the reproducing device 21 is disclosed in a U.S. Pat. No. 4,352,174 entitled "Disc-shaped Recording Medium Reproducing Apparatus" issued Sept. 28, 1982 in which the assignee is the same as that of the present application. When the disc case 25 is inserted through an inserting opening 38 into the reproducing device 21 and then extracted from the reproducing device 21, the lid member 34 separates from the main case body 33 and is left inside the reproducing device 21, and only the empty main case body 33 is extracted outside the reproducing device 21. Hence, the disc 35 is placed onto the turntable and the side of the disc facing up is reproduced. When the empty main case body 33 is inserted into the reproducing device 21, the disc 35 relatively enters within the main case body 33, and the lid member 34 connects to the main case body 33. Accordingly, the disc 35 becomes recovered within the disc case 25 and is obtained outside the reproducing device 21.

The carrying device 22 comprises an arm structure 40 supported angularly rotatable on the frame 23, the clamping mechanism 27 provided at the inner part of the arm structure 40, and an operating mechanism 41 for operating the clamping mechanism 27. The arm structure 40 comprises right and left arms 43 and 42, a ring-shaped circular frame 44 and a frame member 45 respectively fixed between tip ends of the arms 42 and 43, and a frame member 46 fixed between base ends of the arms 42 and 43. The arm structure 40 has a rectangular frame construction in the plan view. Large-diameter gears 49 and 50 are respectively fixed in the vicinity of the base ends of the arms 42 and 43, and the gears 49 and 50 are rotated by a DC motor 47 through a horizontal shaft 48.

Accordingly, rotational forces act on both the right and left side at the base part of the arm structure 40. Thus, the arm structure 40 can stably rotate angularly in the directions A1 and A2 in a state where the acting moments are balanced, accompanying extention and contraction of moment balancing springs 51 and 52 stretched between the frame 23 and the arms 42 and 43. Because the weight of the arm structure 40 is light and can therefore undergo stable angular rotation, the operations to search, carry, and return the disc case 25 can be carried out stably and accurately. The motor 47 is fixed to the frame 23.

Figure 5:
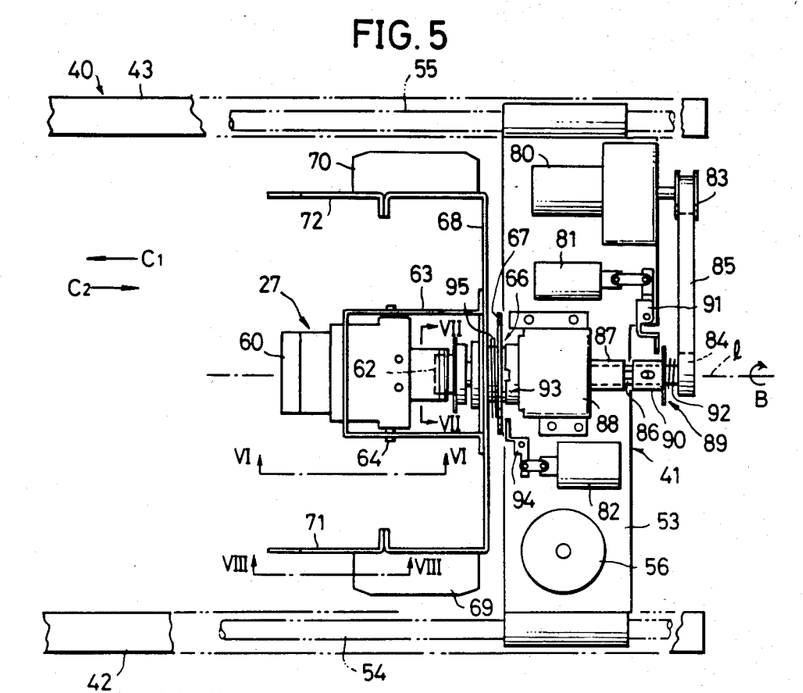
FIG. 5 is a plan view showing a clamping mechanism and a mechanism for operating the clamping mechanism shown in FIG. 2.

As shown in FIG. 5, the clamping mechanism 27 is supported by the operating mechanism 41. A support base 53 of the operating mechanism 41 fits over guide rods 54 and 55 respectively provided inwardly of the arms 42 and 43, and is movable along these guide rods 54 and 55 in the directions C1 and C2 unitarily with the clamping mechanism 27. Pinions (only one shown) vertically provided on both the right and left sides of the support base 53 are designed to roll along racks 58 and 59 which are provided on the lower surfaces of respective arms 42 and 43.

Figure 6:
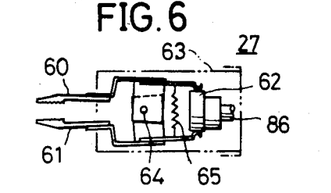
FIG. 6 is an elevation showing the clamping mechanism viewed from a line VI—VI in FIG. 5.
Figure 7:
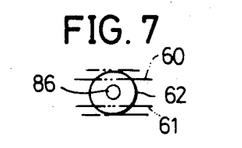
FIG. 7 is an elevation showing an oval cam viewed from a line VII—VII in FIG. 5.
Figure 8:
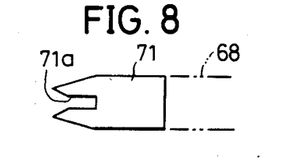
FIG. 8 is an elevation showing a disc case position correcting/supporting member viewed from a line VIII—VIII in FIG. 5.

The clamping mechanism 27 comprises a pair of upper and lower clamp members 60 and 61, and an oval cam 62 for controlling the clamping and releasing operations of the clamp members 60 and 61 by acting on a leaf spring part at a rear part of the clamp members 60 and 61, as shown in FIGS. 6 and 7. The clamp members 60 and 61 are coaxially supported by a shaft 64 penetrating a bracket 63, and are urged to mutually separate, that is, open to a releasing state, by a force exerted by a coil spring 65. The bracket 63 is fixed to a U-shaped bracket 68 which is mounted onto a clutch plate 67 constituting a second clutch mechanism 66. The clamping mechanism 27 undergoes a 180° angular rotation about an axis 1 unitarily with the U-shaped bracket according to the needs. Wings 69 and 70, and disc case position corrrecting and supporting members 71 and 72 shown in FIG. 8 are respectively provided at both arm parts of the U-shaped bracket 68. As will be described hereinafter, when the wings 69 and 70 move in the direction C1 up to a final position, these wings 69 and 70 engage with and fit into a rotary frame within the circular frame 44, to correct and restrict the rotary position of the rotary frame. The disc case position correcting and supporting members 71 and 72 correct the position of the disc case upon clamping of the disc case, if the disc case is slightly shifted from a correct position within the storing part 20, and support the disc case at both sides of the clamping mechanism 27 after clamping of the disc case.

Figure 9:
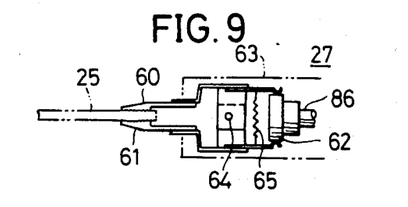
FIG. 9 shows the clamping mechanism in a state clamping the disc case.

When the oval cam 62 undergoes a 90° angular rotation from the position shown in FIG. 7, the clamp members 60 and 61 are guided by the circumferential part of the oval cam 62 having the larger radius of curvature. Hence, the clamp members 60 and 61 close upon each other and the clamping mechanism 27 finally assume a closed state shown in FIG. 9.

The operating mechanism 41, that is, a motor 80 for engaging and disengaging clutch, a first plunger 81, a second plunger 82, and the like, are provided on the support base 53 besides the motor 56. A belt 85 is fit over a pulley 83 of the motor 80 and a pulley 84. The pulley 84 is fixed to one end of an inner shaft 86. The oval cam 62 is fixed to the other end of the inner shaft 86. A cylindrical outer shaft 87 is rotatably fit over the inner shaft 86, and both the shafts 86 and 87 are supported by a bearing 88 which is fixed on the support base 53. A first clutch mechanism 89 and the second clutch mechanism 66 are provided on a shaft structure comprising these shafts 86 and 87 and the bearing 88. The first clutch mechanism 89 comprises a clutch member 90 which is unitarily rotatable with the inner shaft 86 when the first clutch mechanism 89 is in the engaged state and is movable along the inner shaft 86, and the outer shaft 87. The first clutch mechanism 89 engages when the inner shaft 86 undergoes a 90° angular rotation. The first clutch mechanism 89 is disengaged when the first plunger 81 is actuated to angularly rotate an arm member 91 counterclockwise and the clutch member 90 is pushed towards the direction C2 against the force exerted by a coil spring fitted over the inner shaft 86 between the pulley 84 and the clutch member 90. On the other hand, the second clutch mechanism 66 comprises the clutch plate 67 which is unitarily rotatable with the outer shaft 87 when the second clutch is in the engaged state, and a stationary clutch member 93 which is fixed to the bearing 88. The second clutch mechanism 66 engages when the clutch plate 67, that is, the outer shaft 87 and the U-shaped bracket 68 undergo a 180° angular rotation. The second clutch mechanism 66 is disengaged when the second plunger 82 is actuated to angularly rotate an arm member 94 counterclockwise and the clutch plate 67 is pushed towards the direction C1 against the force exerted by a coil spring 95 fitted between the clutch plate 67 and the U-shaped bracket 68.

A rectangular rotary frame 100 is fitted angularly rotatable within the circular frame 44. A pair of disc case supporting finger mechanisms 101 and 102 are provided at diametrical positions on the rotary frame 100. The circular frame 44 and the rotary frame 100 constitute a disc case reversing and supporting mechanism 103 which will be described hereinafter.

The arm structure 40 rotates angularly along locking plates 105 and 106 mounted on both sides of the frame 23. Locking cutouts 105a and 106a are formed in the respective locking plates 105 and 106, at positions corresponding to each of the disc case storing chambers. The arm structure 40 is stopped and locked at a position corresponding to the storing chamber in which the designated disc is stored, when a locking plunger 108 is actuated and a locking member (not shown) projects to fit into the locking cutouts 105a and 106a in the locking plates 105 and 106. In addition, a first address pattern 107 is formed on the inner part of the locking plate 106, and a second address pattern 131 is formed on the inner part of the locking plate 105. Photosensors 130 and 132 shown in FIG. 16 (not shown in FIG. 2) provided in the arm structure 40 cooperate with the first and second address patterns 107 and 131, to detect the rotary position of the arm structure 40 in terms of disc storing addresses as will be described hereinafter.

Next, description will be given with respect to the disc selecting and reproducing operations of the reproducing apparatus 10 having the construction described heretofore, in terms of each of the operating modes.

(1) Disc searching/carrying mode:

When the keyboard 11 is manipulated to designate a predetermined disc case such as the disc case $25_M$ in this mode, for example, the motor 47 starts to rotate. Hence, the arm structure 40 rotates angularly towards the direction A1 from the state shown in FIGS. 2 and 4A, while detecting addresses of the disc storing chambers. When the arm structure 40 reaches the address M, the arm structure 40 stops at this position to oppose the disc case $25_M$ as shown in FIG. 4B.

The motor 56 starts to rotate in this state, and the clamping mechanism 27 moves towards the direction C1 to a foremost position. Thus, the rear part of the disc case $25_M$ fits into cutouts 71a of the disc case position correcting and supporting members 71 and 72, and the position of the disc case $25_M$ is corrected if the disc case $25_M$ is not at the correct position within the storing chamber. In this state, the disc $25_M$ can relatively enter between the open clamp members 60 and 61 of the clamping mechanism 27, and can thus be clamped by the clamping mechanism 27.

In this state, the motor 80 rotates so as to angularly rotate the oval cam 62 by 90°. Hence, the clamping mechanism 27 assumes the state shown in FIG. 9, and clamps the rear part of the disc case $25_M$. Then, the motor 56 undergoes reverse rotation, to cause the clamping mechanism 27 to move in the direction C2. Accordingly, the disc case $25_M$ is extracted from the storing chamber as shown in FIG. 4C, and is drawn into the arm structure 40.

(2) Disc side selecting mode:

In this mode, when side Ⓐ of the disc is designated as the side to be reproduced, the mode of operation changes to the loading mode. However, if side Ⓑ of the disc is designated as the side to be reproduced, the second plunger 82 is temporarily actuated to disengage the second clutch mechanism 66, and the motor 80 starts to rotate. Hence, the inner and outer shafts 86 and 87 rotate unitarily, and the whole clamping mechanism 27 undergoes angular rotation by 180° together with the oval cam 62 towards the direction B, as shown in FIG. 4F. Therefore, the side of the disc case $25_M$ is reversed, and side B of the disc 35 then faces up.

When the rear part of the disc case $25_M$ is clamped and the side of the disc case $25_M$ is reversed, the rotary frame 100 rotates angularly within the circular frame 44, while following the angular rotation of the disc case. The side of the disc case $25_M$ is reversed in a stable state where right and left ends at the front of the disc case are supported by the supporting finger mechanisms 101 and 102.

(3) Disc loading mode:

In this mode, the motor 56 starts to rotate, and the clamping mechanism 27 moves towards the direction C1 up to the foremost position from the state shown in FIG. 4D and thereafter moves back towards the direction C2. By these movements of the disc clamping mechanism 27, the disc case $25_M$ is inserted through the inserting opening 38 into the innermost part of the reproducing device 21. Hence, as shown in FIG. 4E, the lid member 34 and the disc 35 remain within the reproducing device 21, and only the empty main case body 33 is extracted outside the reproducing device 21. The empty main case body 33 is stably supported outside the reproducing device 21, by the clamping mechanism 27 and the supporting finger mechanisms 101 and 102.

(4) Disc reproducing mode:

In this mode, the disc 35 is placed onto the turntable and rotated in the state shown in FIG. 4E, and the designated chapter is reproduced by a pickup mechanism (not shown). During the disc reproducing mode, the reproducing apparatus 10 is maintained in the state shown in FIG. 4E.

(5) Disc recovering mode:

In this mode, the clamping mechanism 27 moves back and forth in the directions C1 and C2 as during the disc loading mode. Hence, the disc 35 is recovered within the empty main case body 33, the lid member 34 connects to the main case body 33, and the disc case $25_M$ is extracted outside the reproducing device 21. The reproducing apparatus 10 thus assumes a state shown in FIG. 4D.

(6) Disc carrying/returning mode:

In this mode, the reproducing apparatus 10 operates in a sequence which is reverse to the operations carried out during the disc searching/carrying mode. Hence, in this mode, the disc case $25_M$ is carried and returned within the original storing chamber as shown in FIGS. 4D, 4C, and 4B. The motor 80 starts to rotate when the clamping mechanism 27 moves towards the direction C1 in the state shown in FIG. 4C, and the clamping of the disc case by the clamping mechanism 27 is released when the oval cam 62 undergoes a 90° angular rotation.

Thereafter, the arm structure 40 rotates angularly towards the direction A2, and the reproducing apparatus 10 returns to its original state shown in FIGS. 2 and 4A.

By repeatedly carrying out the operations described above, the designated disc cases are successively extracted from the storing part 20 and the discs accommodated within the disc cases are reproduced by the reproducing device 21, and then, the discs are recovered within the disc cases and returned to respective original positions in the storing part 20.

Next, description will be given with respect to the disc case reversing and supporting mechanism 103, by referring especially to FIGS. 10 through 14.

Figure 10:
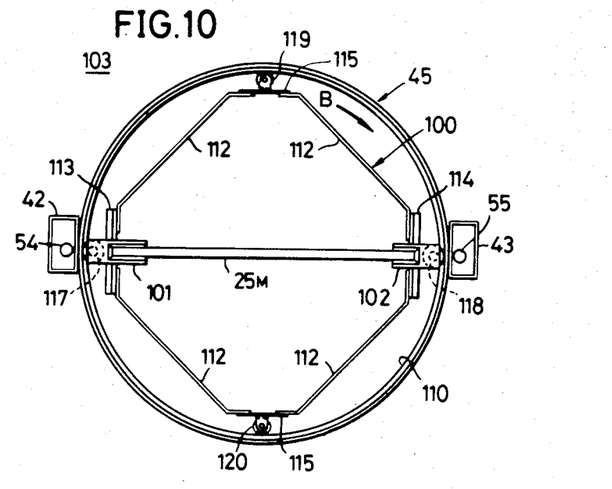
FIG. 10 shows a disc case reversing and supporting mechanism viewed from the clamping mechanism in FIG. 2.
Figure 11:
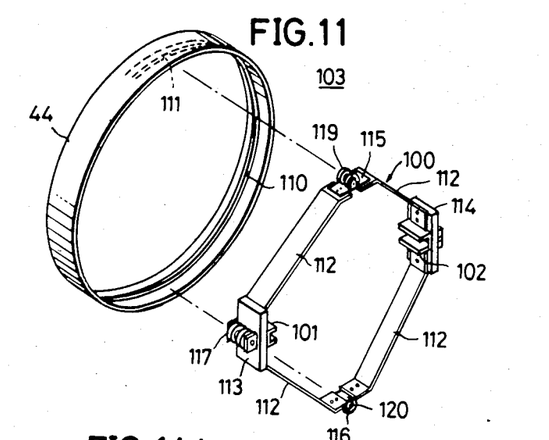
FIG. 11 is a disassembled perspective view showing the disc case reversing and supporting mechanism.

A shown in FIGS. 10 and 11, the disc case reversing and supporting mechanism 103 comprises the circular frame 44 which is supported by the arms 42 and 43 and fixed, and the rectangular rotary frame 100 fitted into the circular frame 44 so as to rotate angularly along a rail on the inner peripheral surface of the circular frame 44.

The circular frame 44 comprises an inwardly projecting rail 110 formed around the entire inner peripheral surface thereof. A depression 111 is formed in the rail 110 at a vertex position of the circular frame 44, for locking the rotary frame 100 for every 180° angular rotation of the rotary frame 100.

The rotary frame 100 comprises four leaf springs 112 connected in a rectangular shape by four roller support bases 113, 114, 115, and 116. The mutually opposing roller support bases 113 and 114 along one diagonal line of the rectangular rotary frame 100 respectively support rollers 117 and 118. On the other hand, the mutually opposing roller support bases 115 and 116 along the other diagonal line of the rectangular rotary frame 100 respectively support locking rollers 119 and 120. The rollers 117, 118, 119, and 120 ride over the rail 110, and each of the roller support bases 113 through 116 are urged radially outwards within the circular frame 44 due to the spring action of the leaf springs 112. Accordingly, the rotary frame 100 undergoes stable angular rotation along the rail 110 within the circular frame 44 without derailing from the rail 110, while being supported at the four rollers 117 through 120.

Figure 12A:
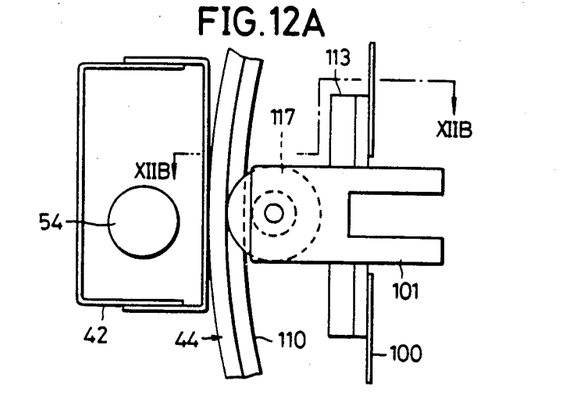
FIG. 12A is an enlarged view showing parts in the vicinity of a roller rolling within a circular frame in FIG. 10.
Figure 12B:
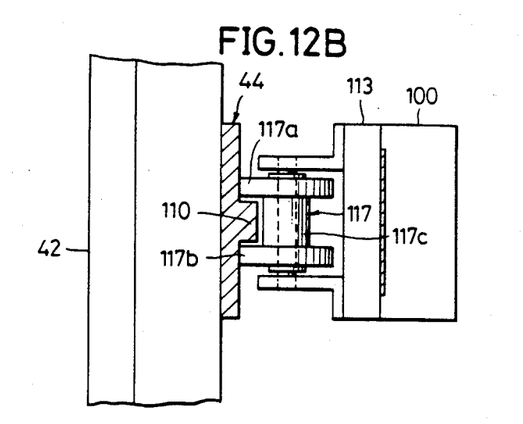
FIG. 12B is an elevation in cross section viewed along a line XIIB—XIIB in FIG. 12A.
Figure 13A:
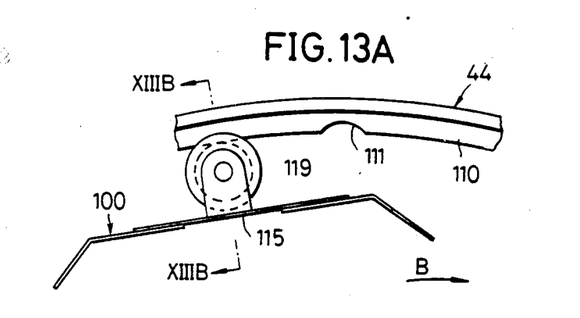
FIG. 13A is an enlarged view showing the parts in the vicinity of the roller rolling along a rail in FIG. 10.
Figure 13B:
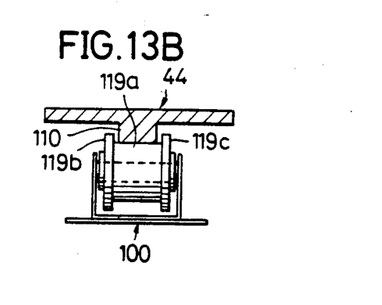
FIG. 13B is an elevation in cross section viewed along a line XIIIB—XIIIB in FIG. 13A.
Figure 14A:
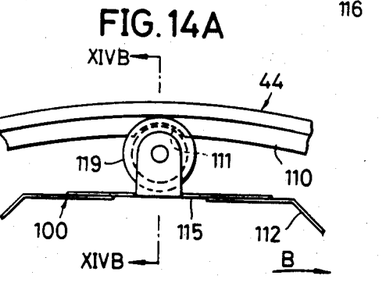
FIG. 14A is an enlarged view in a state where a rotary frame further rotates angularly from the position shown in FIG. 13A and the roller enters within a depression.
Figure 14B:
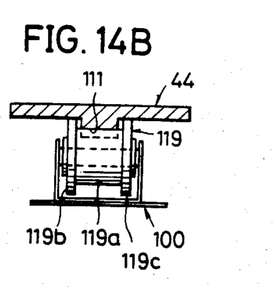
FIG. 14B is an elevation in cross section viewed along a line XIVB—XIVB in FIG. 14A.

The roller 117 supported by the roller support base 113 comprises roller wheel parts 117a and 117b which respectively make contact with the inner peripheral surface of the circular frame 44, and a cylindrical part 117c which is separated from the rail 110, as shown in FIGS. 12A and 12B. The roller 118 which is supported by the roller support base 114 which constitutes a pair with the roller support base 113, has the same construction as the roller 117. On the other hand, the roller 119 supported by the roller support base 115 comprises a cylindrical center part 119a which makes contact with the rail 110, and rims 119a and 119b which are respectively separated from the inner peripheral surface of the circular frame 44, as shown in FIGS. 13A and 13B. The roller 120 which is supported by the roller support base which constitutes a pair with the roller support base 116, has the same construction as the roller 119. Hence, when the rotary frame 100 undergoes angular rotation within the circular frame 44, the rollers 117 and 118 roll over the inner peripheral surface of the circular frame 44, without being catched and locked by the depression 111 in the rail 100. However, the other rollers 119 and 120 are catched and drop into the depression 111 in the rail 110 while rolling over the rail 110, due to the action of the leaf springs 112. Hence, the rollers 119 and 120 are catched and locked by the depression 111 as shown in FIGS. 14A and 14B.

During the disc side selecting mode, the rotary frame 100 is supported by the four rollers 117 through 120 when the clamping mechanism 27 rotates angularly in the direction B, and the rotary frame 100 can thus undergo stable angular rotation. When the rotary frame 100 undergoes a 90° clockwise angular rotation, the roller 117 rolls over the depression 111 in the rail 110 without being catched by the depression 111. Accordingly, the rotary frame 100 does not become locked at the position where the roller 117 confronts the depression 111. As the rotary frame 100 undergoes a further 90° angular rotation in the direction B, the roller 120 which was positioned at the lowermost position of the circular frame 44 before angular rotation of the rotary frame 100, assumes a position confronting the depression 111 in the rail 110. Hence, in this state, the roller 120 drops into the depression 111, as shown in FIGS. 14A and 14B, and the rotary position of the rotary frame 110 is restricted with respect to the circular frame 44. The rollers 119 and 120 which will drop into the depression 111 in the rail 110 are provided at diametrical positions, that is, at positions separated by 180° along the circumference of the rotary frame 100. Therefore, the rotary position of the rotary frame 100 is restricted with respect to the circular frame 44, for every 180° angular rotation of the rotary frame 100.

Accordingly, in a state where the operation to reverse the side of the disc case is completed, the front end of the disc case $25_M$ is also supported by the supporting finger mechanisms 101 and 102 and restricted of its position by the rotary frame 100 and the circular frame 44. Thus, the disc case $25_M$ accurately opposes the inserting opening 38 of the reproducing device 21. Even if the disc case $25_M$ is curved due to ambient conditions and the like, the disc case $25_M$ will become supported in a state where the curve in the disc case $25_M$ is corrected, and the disc case $25_M$ will therefore accurately oppose the inserting opening 38 of the reproducing device 21. As a result, the disc case $25_M$ is inserted through the inserting opening 38 without hitting the front panel of the reproducing device 21 during the following disc loading operation, and the disc 35 is positively loaded within the reproducing device 21.

The depression 111 in the rail 110 has an arcuate shape so that the roller 117 or 118 can catched and locked, but still permit the roller 117 or 118 to easily follow the angular rotation of the rotary frame 100. In addition, as the disc case $25_M$ is inserted into the reproducing device 21, the disc case supporting finger mechanisms 101 and 102 provided on the rotary frame 100 are urged towards the direction C1 due to friction between contacting parts of the disc case $25_M$ and the supporting finger mechanisms 101 and 102. However, the rotary frame 100 will not disengage from the circular frame 44 due to the urging force acting on the supporting finger mechanisms 101 and 102 along the direction C1, because the rollers 117 through 120 ride over the rail 110 and will not derail therefrom.

In the embodiment described heretofore, only one depression 111 is formed in the rail 110, and the two rollers 119 and 120 drop into the depression 111. However, two depressions may be formed in the rail 110 at diametrical positions, and in this case, only one roller will be designed to drop into these depressions.

Next, description will be given with respect to means for controlling the angular rotation and stopping of the arm structure 40 (disc case carrying device 22), during the disc searching/carrying mode and disc carrying-/returning mode.

Figure 16:
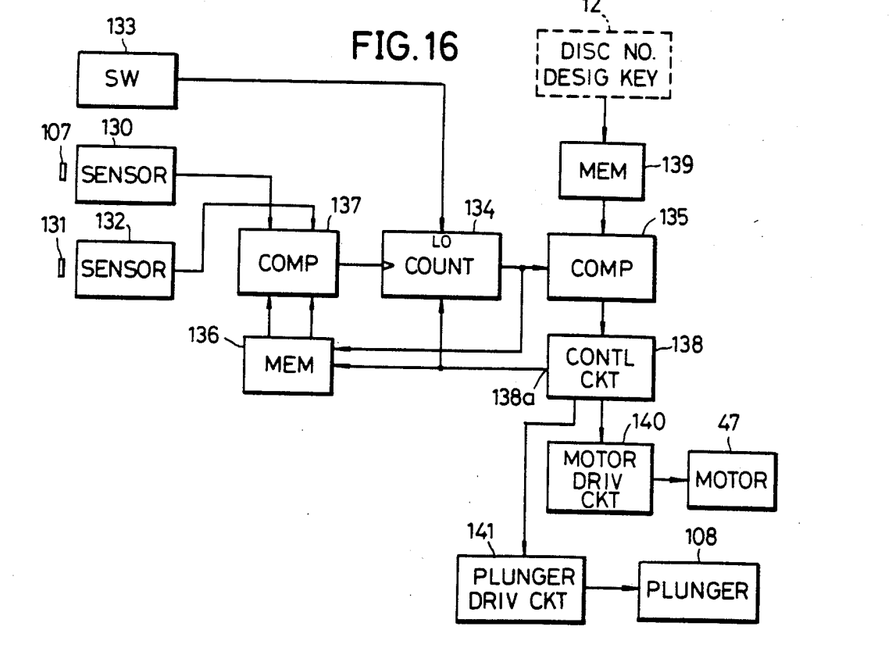
FIG. 16 is a systematic block diagram showing movement control means of a disc case carrying device.

The first address pattern on the locking plate 106 cooperates with the photosensor 130 shown in FIG. 16 which is mounted to the arm structure 40. The second address pattern 131 on the other locking plate 105 cooperates with the photosensor 132 shown in FIG. 16 which is also mounted to the arm structure 40. For example, the photosensors 130 and 132 read the opposing address patterns by generating a high-level signal at a depression of the address pattern and generating a low-level signal at a projection of the address pattern.

The first address pattern 107 has a pattern in which a part corresponding to the disc case storing chamber furthest from the reproducing device 21 is a depression, a part corresponding to a disc case storing chamber adjacent to this storing chamber furthest from the reproducing device 21 is a projection, and the depressions and projections in the pattern are repeated for each of the disc case storing chambers. The photosensor 130 opposing the first address pattern 107 generates a pulse having a waveform shown in FIG. 15A, according to the addresses 1, 2, ..., N of the disc case 25 which are assigned from the disc case located furthest from the reproducing device 21. The second address pattern 131 has a pattern in which parts corresponding to disc storing chambers at the addresses 1 and 2 are depressions, parts corresponding to the disc case storing chambers at the addresses 3 and 4 are projections, and the depressions and projections in the pattern are repeated for every two disc case storing chambers. The photosensor 132 opposing the second address pattern 131 generates a pulse having a waveform shown in FIG. 15B, according to the addresses of the disc case storing chambers. In addition, a microswitch 133 shown in FIGS. 3 and 16 which is pushed by the carrying device 22 and closes when the carrying device 22 assumes a horizontal position, is provided on one end of the locking plate 106 closer to the reproducing device.

Figure 17A:
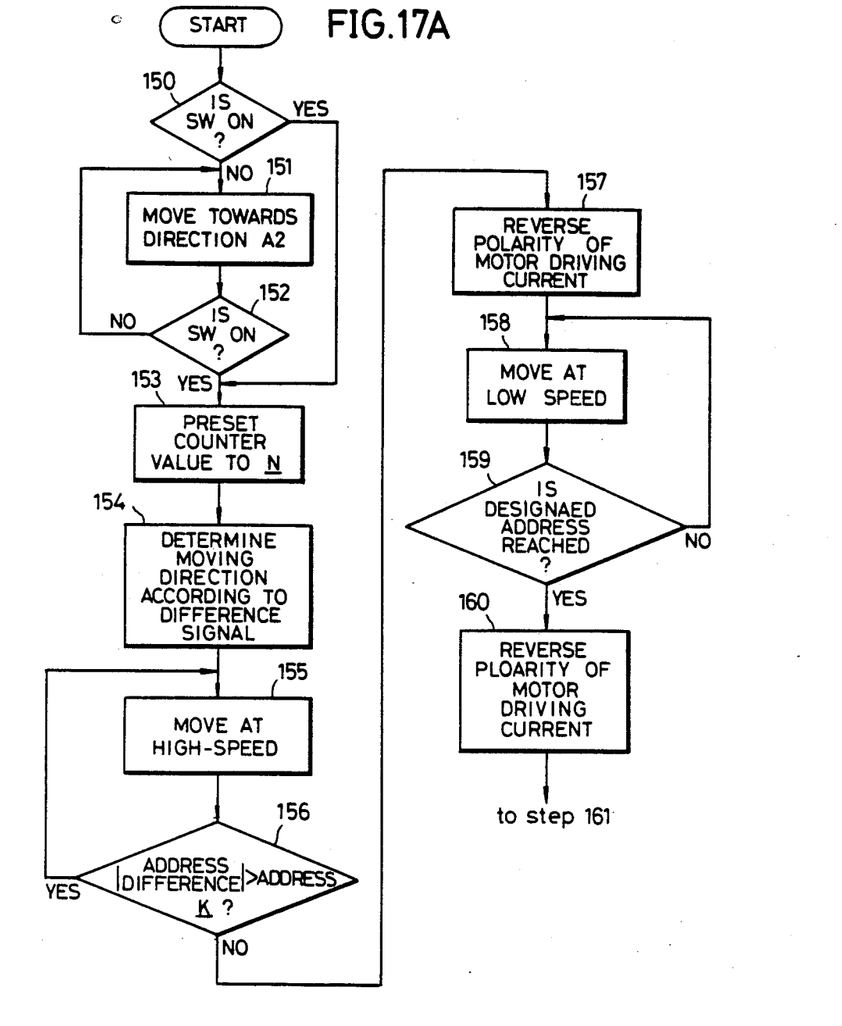
FIGS. 17A and 17B respectively are flowcharts for explaining the operations of the movement control means for the disc case carrying device.
Figure 17B:
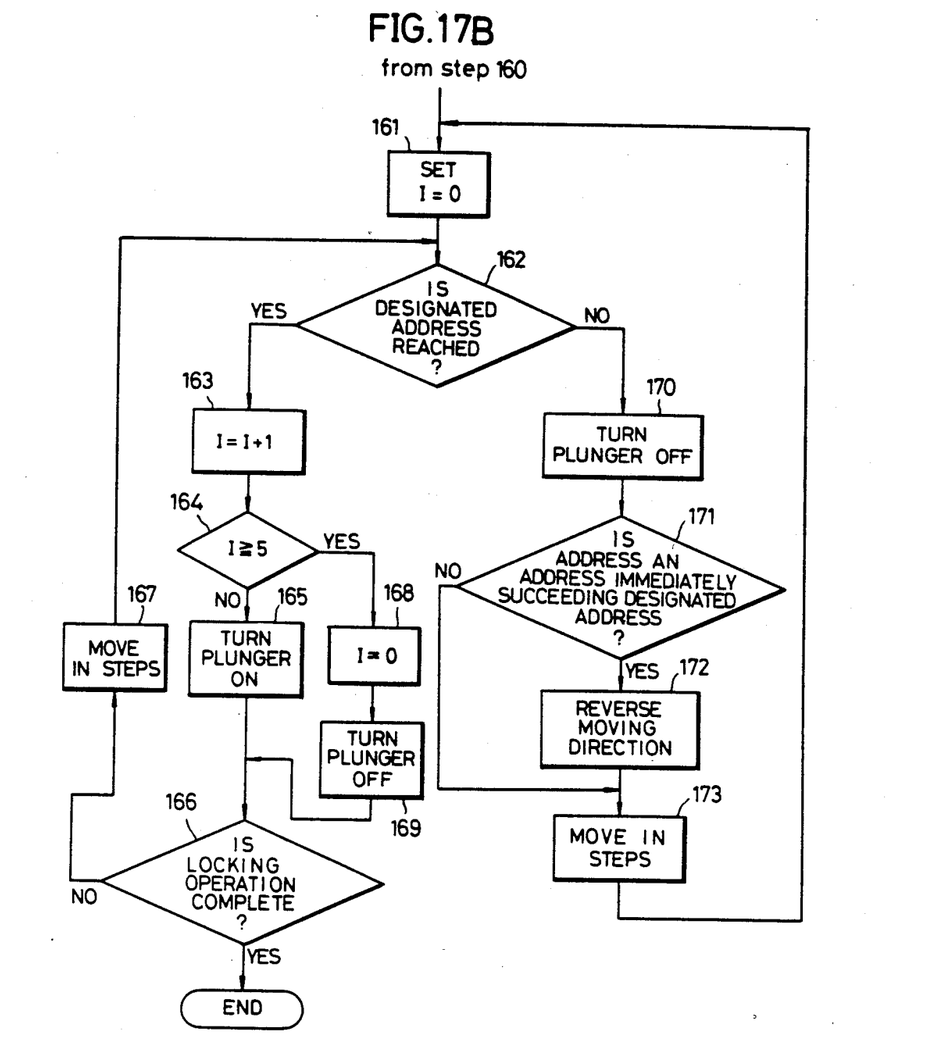

Referring now to FIGS. 16, 17A, and 17B, when a power source is connected to the reproducing apparatus 10, the carrying device 22 is forcibly rotated angularly to the horizontal position, and the microswitch 133 closes to generate a high-level signal. This high-level signal is supplied to a load terminal LO of a preset type up-down counter 134. These operations correspond to steps 150 through 152 shown in FIG. 17A. The counted value in the counter 134 is accordingly preset to N at a step 153, due to the high-level signal supplied to the load terminal LO. The preset counted value N in the counter 134 corresponds to the number of disc case storing chambers within the disc case storing part 20. The counted value in the counter 134 is supplied to a comparator 135 and a memory 136. Another comparator 137 compares the signals from the photosensors 130 and 132 with the 2-bit signal from the memory 136, and supplies a high-level coincidence signal to a counter input terminal of the counter 134 when the signals coincide. When the coincidence signal from the comparator 137 is supplied to the counter 134 after the counter 134 is preset by the signal from the microswitch 133, the counter 134 counts up when the level of the signal from a terminal 138a of a control circuit 138 is high and counts down when the level of the signal from the terminal 138a is low, as will be described in more detail hereinafter. The counted value in the counter 134 is supplied to the comparator 135. A designated address which is produced according to the manipulation of the disc number designating key 12 on the keyboard 11, is stored within another memory 139. This designated address is supplied to the comparator 135.

The comparator 135 compares the designated address and the counted value in the counter 134, and supplies a resulting difference signal to the control circuit 138. The control circuit 138 generates different control signals according to the polarity of the difference signal, for a case where the present address of the carrying device 22 is separated from the designated address by over k addresses (for example, k is 1 or 2), a case where the address of the carrying device 21 is separated from the designated address by k or less addresses, and a case where the address of the carrying device 22 is the designated address. The control signal generated by the control circuit 138 is supplied to a motor driving circuit 140. The motor driving circuit 140 reverses the polarity of a driving current flowing through the DC motor 47, according to the polarity of the above difference signal. Moreover, the motor driving circuit 140 sets the duty cycle of the driving current to a large value when the carrying device 22 is at the address separated from the designated address by over k addresses, and sets the duty cycle of the driving current to a small value when the carrying device 22 is at the address separated from the designated address by k or less addresses. Accordingly, the carrying device 22 which is moved by the motor 47, is determined of its moving direction according to the polarity of the difference signal at a step 154, and is moved at a high-speed towards the determined direction (in the direction A1 in this case) at a step 155. When the address of the carrying device 22 becomes an address which is separated from the designated address by k or less (k is 1 or 2, for example) addresses at a step 156 as a result of the above high-speed movement, the polarity of the motor driving current applied to the motor 47 is reversed for a short period of time at a step 157 to carry out a braking operation with respect to the motor 47. The duty cycle of the driving current is thereafter reduced to a small value, and the carrying device 22 then undergoes movement at a reduced low speed at a step 158. Then, when the counted value in the counter 134 becomes equal to the designated address at a step 159, the polarity of the motor driving current applied to the motor 47 is reversed for a short period of time to carry out a braking operation with respect to the motor 47 at a step 160, and the carrying device 22 is stopped.

Further, when the value of the difference signal becomes zero, that is, when the address of the carrying device 22 is the designated address, a control signal is supplied to a plunger driving circuit 141 from the control circuit 138 to actuate the locking plunger 108. Hence, lock members enter within the corresponding cutouts 105a and 106a of the locking plates 105 and 106, to lock the carrying device 22 at the designated address, at steps 162, 165, and 166. A step 161 presets I to zero, where I indicates a count of the operation in which the carrying device 22 is moved in steps.

There are cases where the carrying device 22 is stopped at the designated address, but is at a position slightly shifted from a position where the carrying device 22 can be locked and the lock members cannot enter within the cutouts 105a and 106a of the locking plates 105 and 106 even when the locking plunger 108 is actuated. In such as case, the motor 47 is repeatedly rotated instantaneously, in a state where the locking plunger 108 remains actuated, to move the carrying device 22 in small steps. The lock members normally enter within the corresponding cutouts 105a and 106a as the step movement of the carrying device 22 is repeated five times, and the carrying device 22 becomes locked at the designated address. These operations are carried out in steps 162, 163, 164, 165, 166, and 167. In a case where the lock members enter within the corresponding cutouts 105a and 106a in an incomplete manner, the motor 47 will be forced to rotate although the carrying device 22 cannot move, and this is undesirable. Moreover, even if the above described operations are repeatedly carried out to move the carrying device 22 is small steps, the carrying device 22 will not become locked in a normal manner. Hence, if the carrying device 22 cannot be locked in a normal manner at the designated address even after the above described operations are repeated five times to move the carrying device 22 in small steps, the locking plunger 108 is once turned OFF to eliminate the incomplete locking state at steps 168 and 169 and the operation is restarted from the step 167.

When the carrying device 22 is stopped at an address other than the designated address, the locking with respect to the carrying device 22 is released by turning OFF the locking plunger 108 at a step 170. Then, if the carrying device 22 is at an address beyond the designated address at a step 171, the moving direction of the carrying device 22 is reversed at a step 172, and the carrying device 22 is moved in steps at a step 173. The present address of the carrying device 22 and the designated address are repeatedly compared and the carrying device 22 is repeatedly moved in steps until the designated address is reached and the lock members enter within the corresponding cutouts 105a and 106a of the locking plates 105 and 106.

Next, description will be given with respect to the memory 136 shown in FIG. 16, and the operations of circuits related to the memory 136.

The value "26" which is an example of the value of N, satisfies a relation $(4 \times n + 2)$ where n is a natural number. When the level of the signal from the terminal 138a is high, the memory 136 reads out the memory contents at an address designated by a value a (a is a remainder obtained when a counted value A in the counter 134 is divided by four) which is obtained from the counted value in the counter 134, from a memory region where two bits (0,1), (1,0), (0,0), and (1,1) are respectively stored at the addresses 1, 2, 3, and 4. On the other hand, when the level of the signal from the terminal 138a is low, the memory 136 reads out the memory contents at an address designated by the value a which is obtained from the counted value in the counter 134, from a memory region where two bits (0,0), (1,1), (0,1), and (1,0) are respectively stored at the addresses 1, 2, 3, and 4. The 2-bit information thus read out, is supplied to the comparator 137 in terms of bits.

In addition, the signals from the photosensors 130 and 132 are supplied to the comparator 137, and compared with the 2-bit information read out from the memory 136. The comparator 137 produces a high-level signal when the signals coincide, and this high-level signal is supplied to the counter input terminal of the counter 134. For example, when the initial setting sets the counted value in the counter 134 to N and the control circuit 138 produces a low-level signal through the terminal 138a so as to move the carrying device 22 towards the direction A1, the 2-bit information (1,1) is read out from the memory 136, and the photosensors 130 and 132 generate signals (0,1). When the carrying device 22 begins to rotate angularly thereafter, the signals from the photosensors 130 and 132 change to (1,1), and the comparator 137 produces the coincidence signal and supplies this coincidence signal to the counter 134 to reduce the counted value in the counter 134. That is, the counted value in the counter 134 is changed only when the signals from the photosensors 130 and 132 are signals which are obtained at an immediately succeeding address along the moving direction of the carrying device 22. Accordingly, even if chatter is introduced when the levels of the signals from the photosensors 130 and 132 change over, or even if changing points in the address patterns do not coincide, the counter 134 does not carry out erroneous counting operation, and the counter 134 can thus carry out an accurate counting operation. This accurate counting operation carried out by the counter 134 ensures accurate stopping of the carrying device 22 at the designated address.

Figures 15A, 15B:
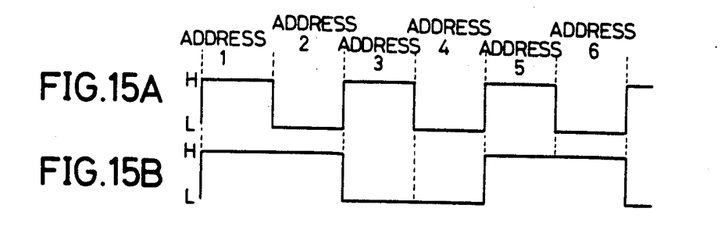
FIGS. 15A and 15B are graphs respectively showing signal waveforms of respective output signals of photosensors moving along first and second address patterns.

The carrying device 22 may sometimes stop at a position slightly shifted from the designated address. As shown in FIGS. 15A and 15B, if the carrying device 22 is at an address which is one address before or beyond the designated address, it can be determined whether the carrying device 22 is at an address before or beyond the designated address according to the signals obtained from the photosensors 130 and 132. After the carrying device 22 is stopped, and a high-level or low-level signal is produced through the terminal 138a, to compare the signals from the photosensors 130 and 132 with the 2-bit bit pattern which is to be obtained at an address which is one address before or beyond the address indicated by the counted value in the counter 134 at the point in time when the stopping operation is started to stop the carrying device 22. Hence, the counted value in the counter 134 becomes equal to the address where the carrying device 22 actually stops. Thus, even if the carrying device 22 stops at an address which is one address before or beyond the designated address, the control circuit 138 minutely adjusts the angular rotation of the carrying device 22 to accurately stop the carrying device 22 at the designated address.

The means for controlling the angularly rotating direction, angular rotation, stopping of the angular rotation, and locking at the stopping position of the carrying device 22 is not limited to the embodiment described heretofore, and may be designed in accordance with the mechanical construction of the reproducing apparatus. For example, in a case where the carrying device 22 could stop at an address which is two to four addresses before or beyond the designated address, an address pattern having a pattern in which depressions and projections are repeatedly formed for every four addresses may be added. In this case, it becomes possible to determine a shift in the address of up to four addresses before or beyond the designated address.

In the embodiment described heretofore, description was given for a case where the recording medium is a disc accommodated within a disc case. However, the reproducing apparatus according to the present invention may be suitably applied to cases where the recording medium is other than the disc such as compact type cassette, cartridge, and video cassette.

Further, the present invention is not limited to these embodiments, but various variations and modifications may be made without departing from the scope of the present invention.

What is claimed is:

1. A reproducing apparatus for automatically selecting and playing a recording medium, said reproducing apparatus comprising:

a frame;

a reproducing device mounted horizontally with respect to said frame for playing a recording medium loaded therein;

a storing part for storing a plurality of recording mediums in a radial arrangement, said storing part comprising a plurality of chambers each of which stores one of the recording mediums and has an address assigned thereto, said storing part being provided within a predetermined space defined by two parallel vertical planes extending perpendicularly to a horizontal plane passing through said reproducing device and first and second arcuate planes having a common center axis, said first arcuate plane having a radius of curvature less than that of said second arcuate plane, said predetermined space being located within said frame below said horizontal plane;

designating means for designating an address corrsponding to one storing chamber out of said plurality of storing chambers;

holding and carrying means including first means comprising an arm structure for carrying said one recording medium to and from said storing part and for loading and unloading said one recording medium into and from said reproducing device and second means for supporting said arm structure for rotation substantially about said common center axis, said first means holding said one recording medium taken out from said designated chamber and moving between said storing part and said reproducing device by undergoing an angular rotation so as to carry said one recording medium and load said one recording medium into said reproducing device, said first means taking out said one recording medium from said designated chamber in a direction toward said common center axis crossing said first arcuate plane and loading said one recording medium into said reproducing device in a substantially horizontal direction away from said common center axis, said first means further comprising a base movable back and forth along said arm structure, a clamping mechanism mounted on said base for clamping one end of said one recording medium, base moving means for moving said base toward a tip end of said arm structure when clamping said one recording medium within said storing part and when loading said one recording medium into said reproducing device, and for moving said base toward a rear end of said arm structure when extracting said one recording medium from said reproducing device, and a mechanism for angularly rotating said arm structure when carrying said one recording medium between said storing part and said reproducing device, said holding and carrying means further comprising third means for angularly rotating said clamping mechanism by 180° for reversing a playing side of said one recording medium, a ring-shaped member fixedly mounted at the tip end of said arm structure, and a rotary frame member rotatably fitted within said ring-shaped member for supporting said one recording medium at an end thereof opposite the end clamped by said clamping mechanism, said one recording medium and said rotary frame member being rotated by said third means when reversing the playing side of said one recording medium.

2. A reproducing apparatus as claimed in claim 1 in which said ring-shaped member comprises a locking mechanism for locking said rotary frame member for every 180° angular rotation of said rotary frame member.

3. A reproducing apparatus as claimed in claim 2 in which said locking mechanism comprises a rail on an inner peripheral surface of said ring-shaped member, said rail having a depression at a predetermined position thereof, rollers supported on said rotary frame member for riding over said rail and rolling over the inner peripheral surface of said ring-shaped member, and locking rollers supported on said rotary frame member for rolling over said rail and dropping into said depression in said rail for every 180° angular rotation of said rotary frame member.

* * * * *